UNITED STATES PATENT OFFICE.

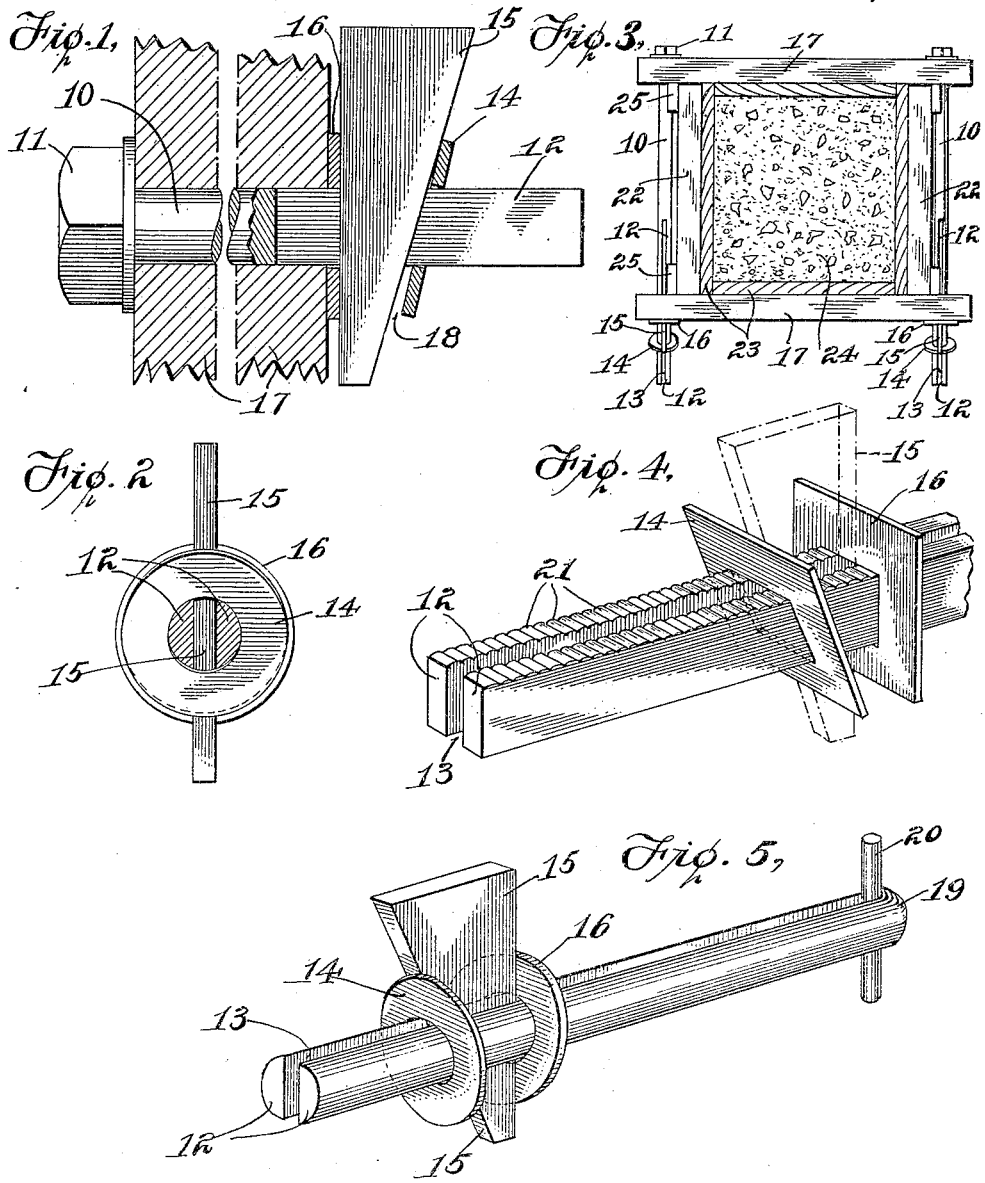

CHARLES S. PEET, OF NEW YORK, N. Y.

CLAMP-BOLT.

1,374,227.  Specification of Letters Patent.  Patented Apr. 12, 1921.

Application filed March 17, 1920. Serial No. 366,695.

*To all whom it may concern:*

Be it known that I, CHARLES S. PEET, a citizen of the United States, and resident of New York city, in the county of Kings and State of New York, have invented certain new and useful Improvements in Clamp-Bolts, of which the following is a specification.

My invention relates to fastening means of the bolt type and particularly to a construction in which the usual nut is dispensed with and means is provided in place thereof for readily and rapidly clamping the bolt or similar member in operative position.

A primary and well-recognized disadvantage of the usual type of threaded bolt is the fact that a substantial amount of time and labor is required in starting a nut on the bolt threads and in screwing the nut down into position. This drawback is greatly accented when a large number of bolts is employed, or where the bolts are temporary and the nuts must not only be screwed into position, but must also be removed.

Furthermore, on certain types of temporary work it is highly desirable to provide bolts of standard length for clamping together members varying in thickness, the result being that such bolts are necessarily too long for some jobs, requiring considerable labor in screwing down the nuts and in removing them from the long projecting threaded portion of the bolt.

While these disadvantages are well-recognized, no substitute for the standard bolt has come into general use, mainly owing to the fact that any device used for such purposes should have not only the faculty of holding firmly in fixed position the members engaged by the bolt, but also should possess the ability to draw such members together tightly, this result being effectively produced by the screwing down or tightening of the usual nut. A primary object of my invention is to provide a bolt or similar fastening device which may be readily and rapidly clamped in place, holding the bolt-engaged members in fixed position and drawing them together, without the use of a threaded nut.

A further object is to provide such a bolt which may be clamped in operative position with the same speed and facility, regardless of the thickness of the members held by such bolt between its head and its clamping members, thus facilitating the use of a standard bolt on a large variety of jobs.

Another object is the accomplishment of these results by employing a construction which may be effectively operated without the use of special tools.

My invention includes the use of a wedge element forced into position between the structure through which the bolt passes and a bolt-engaging element, so as to draw the bolt tight and hold it in place. I am aware that wedge elements have been used heretofore for this general purpose; but so far as I know, such wedges all bear against an abutment carried by the bolt either directly or indirectly, such abutment taking the full force of the wedge action. One common construction includes a bolt having a longitudinal slot with a closed end, the wedge being inserted in the slot and exerting its pressure against said closed end either directly or indirectly. Such constructions, however, have a very limited range of adjustment, are somewhat expensive to manufacture, and many of them include such complications in construction that they are impractical and have never come into general use.

A principal feature of my invention is the employment of a clamp element adapted to engage the bolt at a large number of points in the length thereof, and which provides a fixed bearing against which the wedge may act to clamp the bolt in position. Specifically, I employ such a clamp element which is provided with portions overlying and adjacent to opposite sides of the bolt, and which may be cramped or tilted so that such portions engage the opposite bolt sides, the wedge bearing against one of said portions and tending to maintain the clamping element in its cramped bolt-engaging position. It will be apparent that with this construction, increased pressure from the wedge will serve merely to increase the cramping engagement of the clamp element with the bolt; so that the engagement is to a certain extent proportionate to and variable with the amount of pressure thereon, tending to prevent slipping of the clamp element and facilitating ready release thereof.

Another primary object of my invention is to provide a construction, capable of accomplishing some or all of the above objects, which at the same time is extremely cheap and simple both in construction and operation. A great many quick-acting bolt clamps, nut locks, and similar devices have been evolved, but the vast majority even of those which are effective in operation have failed to come into use primarily because of expense or complicated construction, or because the employment thereof requires skill and care. In the form of my invention disclosed herein and obvious modifications thereof, I provide a device of this type which may be manufactured more cheaply and easily even than the usual bolt. My device, furthermore, includes but few simple parts, capable of being very strongly constructed, and capable of being applied to and removed from the work by ordinary unskilled labor.

Further objects and advantages of my invention will be apparent from the following description, taken in connection with the accompanying drawings, in which:

Figure 1 is a side view of one form of my device shown in applied position, parts being broken away, Fig. 2 is an end view, Fig. 3 is a plan view, partly in section, illustrating one method of use, Fig. 4 is an enlarged perspective view of another form of clamp, and Fig. 5 is a perspective view of still another variation.

I employ a bolt-like element 10, which may be constructed in various ways, being provided in general with a fixed abutment at one end, which may consist of the usual bolt head 11, adapted to engage one side of a member through which the bolt passes. The opposite end of the bolt is preferably composed of a pair of parallel bars 12 having a slot 13 therebetween. One form of such construction is shown in Fig. 1, and includes the usual form of bolt slotted longitudinally from its outer end, the length of the slot being determined by the extent of adjustment in length which is desired. While the outer end of the bolt may be threaded, if a standard bolt is adapted for use in accordance with my invention, such threading is not necessary.

I provide a clamping element which includes portions overlying the faces of bars 12 adjacent the opposite sides of slot 13, and adapted to be cramped or tilted into engagement with such opposite sides. To produce this result, the distance between the bolt-engaging portions must obviously be slightly greater than the depth of the bars 12 along the slot. By regulating this distance, the cramping angle or angle of engagement may be accurately determined so as to obtain the maximum clamping effect.

I have disclosed one form of clamping element, the embodiment therof which is preferably employed with the bolt form shown in Fig. 1 comprising a round washer 14, which may be of metal of the usual type, with a central opening slightly larger than the diameter of the bolt. I also employ a wedge 15, which preferably is of sufficient thickness to fit snugly in slot 13, the length of the wedge preferably being such that it will project below the lower end of the clamping member 14. If desired, a similar washer 16 may be placed between wedge 15 and the structural elements or members 17 through which the bolt passes, this arrangement being desirable in case members 17 are of wood or other soft substance; but it is understood that the use of any element between wedge 15 and the members 17 is purely optional and determined by special conditions of use.

To produce the most effective clamping pressure on member 14, I prefer to taper wedge 15 in such a way that when driven into place the wedge will exert a pressure against the upper outwardly tilted portion of member 14 only, leaving a space between the wedge 15 and the lower part of member 14, as at 18. With this arrangement, it will be apparent that increased pressure from the wedge will tend to tilt member 14 into still closer engagement with the bolt 10.

While I have shown a bolt of the usual construction in Fig. 1, capable of being readily and cheaply manufactured, it will be apparent that my invention is not limited to such a construction, nor is it limited to structures which fall strictly within the ordinary limits of the word "bolt". For instance, I have shown in Fig. 5 a variant form in which a half round rod is bent medially, as at 19, to form a bolt-like fastening member, this construction being particularly cheap and thoroughly effective. A pin 20 or any other holding device may be passed through bend 19 and serves the same purpose as bolt head 11.

The employment of bars 12, which in combination have a generally round contour, has a particular advantage in that the bar-engaging surfaces of the clamp member 14 may be so contoured as to engage only a relatively narrow area at the top and bottom of the bolt when first cramped into engagement therewith, thus tending strongly to produce a slight deformation of the bolt metal which is highly desirable in preventing the slipping of member 14 along the bolt. Increased pressure will increase the area of bolt metal engaged by member 14, as such member forces its way into the bolt, thus preventing the production of deep notches. In practice, it has been found that the usual metal employed in bolts and washers is of such a degree of hardness that the clamping effect will be produced with the construction shown, without any tendency to slip or slide.

However, it will be readily apparent that my invention is not limited to round or curved bars 12, as such bars may be rectangular in form, as shown in Fig. 4. Moreover, while I have referred to the production of indentations in the bars 12 when member 14 is cramped, it will be understood that these indentations may be entirely negligible, the holding effect being produced substantially by friction.

While the surface of bars 12 engaged by clamping member 14 may be perfectly smooth, my invention includes the provision therein of suitable sockets, such as notches 21, shown best in Fig. 4, in which member 14 may be located to effectively prevent longitudinal slipping thereof, said notches being located either on the top or the bottom of said bars 12, or on both sides thereof. It will be apparent that when the bolt is constructed in the form shown in Fig. 1 from the usual threaded bolt, the threads adjacent the edges of slot 13 will, in themselves, serve to a certain extent as sockets 21 into which the clamping washer 14 will be forced by wedge 15.

It is to be understood that my invention is not restricted to a bolt having a permanent fixed head, as it will be evident that this feature may be dispensed with, depending upon the manner of employment of the fastener generally referred to as a bolt; and if desired, the bolt portion may consist merely of parallel rods having the clamping construction disclosed on both sides of the structural member 17 instead of on one side only.

One application of a bolt constructed in accordance with my invention is illustrated in Fig. 3 in connection with the setting up of concrete molds of the type especially adapted for pouring pillars. The members 17 and cross pieces 22 butting against said members form a rectangular frame about the mold board 23 within which the concrete 24 is formed. The bolts 10 pass through members 17 in the general way shown in Fig. 1 and are rapidly clamped in position by slipping washers 14 and 16 over each of said bolts and driving a wedge 15 between each pair of washers. The side bars 22 may be forced inwardly by wooden wedges 25 between said bars and bolts 10, this construction being standard.

It will be apparent that where columns of various sizes are to be constructed, the bolts must be of a size sufficient to accommodate the largest pillar form; and when such bolts are used with small pillar forms, they may be clamped in position as rapidly and easily as with the large ones, in contrast to the usual bolt, with which the nut must be turned down over a long stretch of threaded bolt end.

It will be evident from the foregoing description that my invention, in its preferred form, includes essentially only three parts, namely, the bolt, the clamping member, and wedge 15, being extremely simple in construction and strong. Furthermore, the manner of operating or applying the clamp is so simple that an ordinary workman with a hammer can do the work.

Moreover, the clamping effect is not only strong and the construction firm, but the wedge may be released and the bolt removed almost instantaneously.

I have shown a slot construction and a wedge located therein, with the clamping member completely encircling the bolt. This construction is advantageous, as it maintains the bars 12 at a fixed distance, approximately equal to the thickness of wedge 15, preventing separating or jamming thereof. However, it will be apparent that variations may readily be devised in which the wedge is not located in a central slot, but is applied to clamping member 14 outside of the slot, which will then be dispensed with; and my invention includes such constructions.

Furthermore, while wedge 15 is an important part of my invention, the essential feature is the engagement of the bolt by a cramping action to form an abutment against which pressure may be applied to the members 17, holding the bolt and the members in place; and my invention is not necessarily limited to the specific construction disclosed, as various mechanical equivalents for the wedge are known to those skilled in the art.

While I have described the preferred form of my invention and certain variations thereof, it will be apparent that many other changes may be made within the scope of my invention as set forth in this specification. The expression "cramped" or "cramping," as applied to the element corresponding to washer 14, is intended in the claims to indicate the tilting of the member at an angle to the axis of the bolt to such an extent that the member engages said bolt.

I claim:

1. A fastening device of the bolt type including a shank, an abutment member on said shank adapted to engage one side of an object, a unitary integral clamping member adapted to engage the shank adjacent the opposite side of the object, and clamping means adapted to engage said opposite side of the object and bear against the clamping member, the outward pressure of said means against said member maintaining the latter in locked engagement with the shank.

2. A fastening device of the bolt type including a shank, an abutment member on said shank adapted to engage one side of an object, a unitary integral clamping member adapted to engage the shank at any one of a plurality of points to permit its location at a suitable distance from the opposite side of the object, and clamping means adapted to engage said opposite side of the object and bear against the clamping member to lock it in position on the shank.

3. A fastening device of the bolt type including a shank, an abutment member on said shank adapted to engage one side of an object, a unitary integral clamping member adapted to engage the shank adjacent the opposite side of the object, and a wedge adapted to engage said opposite side of the object and bear against the clamping member, the outward pressure of the wedge against said member locking the latter in position on the shank.

4. A fastening device of the bolt type, including a shank, an abutment member on said shank adapted to engage one side of an object, a unitary integral clamping member adapted to engage opposite sides only of the shank adjacent the opposite side of the object, and clamping means adapted to engage said opposite side of the object and bear against the clamping member, the outward pressure of the means against said member locking the latter in position on the shank.

5. A fastening device of the bolt type including a shank, an abutment member on said shank adapted to engage one side of an object, a clamping member adapted to engage the shank adjacent the opposite side of the object by cramping the clamping member relative to the axis of the shank, to engage opposite sides of said shank, and clamping means adapted to engage said opposite side of the object and bear against the clamping member to maintain it in position on the shank.

6. A fastening device of the bolt type including a shank, an abutment member on said shank adapted to engage one side of an object, a clamping member adapted to engage the shank adjacent the opposite side of the object, said clamping member being adapted to be cramped at an angle to the axis of the shank into engagement with opposite sides of said shank, and a wedge adapted to engage said opposite side of the object and bear against the outwardly turned portion of the clamping member to maintain said member in position on the shank, the construction being such that when the wedge is driven into position between the object and the clamping member, the pressure of the wedge will be exerted upon the clamping member only adjacent the outwardly turned portion thereof, the inwardly turned portion adjacent the point of the wedge being free from pressure therefrom.

7. A fastening device of the bolt type including a shank, an abutment member on said shank adapted to engage one side of an object, a clamping member having a central aperture slightly larger than the shank adapted to fit thereover and to be cramped into engagement with said shank, and a wedge adapted to engage the opposite side of the object and to bear against said clamping member to maintain it in cramped engagement with the shank.

8. A fastening device of the bolt type including a shank, an abutment member on said shank, adapted to engage one side of an object, a clamping member of the washer type formed of sheet material and having a central aperture slightly larger than the shank and adapted to be cramped into engagement with said shank, and a wedge adapted to engage the opposite side of said object and bear against only the outwardly tilted portion of said clamping member to maintain it in cramped engagement with the shank.

9. A fastening device of the bolt type including a shank provided with a longitudinal recess, an abutment member on said shank adapted to engage one side of an object, a clamping member of the washer type having an aperture slightly larger than the shank and adapted to be cramped into engagement with said shank, and a wedge adapted to be located in the shank recess in engagement with the opposite side of the object and bear against the outwardly turned portion of the cramping member to maintain it in cramped engagement with the shank.

Signed at New York city, in the county of New York and State of New York this 16th day of March, A. D. 1920.

CHARLES S. PEET.